Dec. 22, 1959  J. D. RUSSELL  2,918,564
PRESSURE-CONTROLLABLE ROTARY WELDING ELECTRODES
Filed March 13, 1958
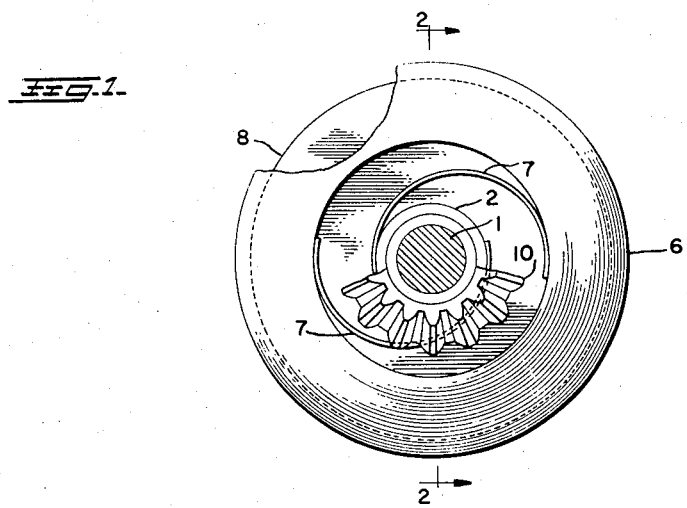
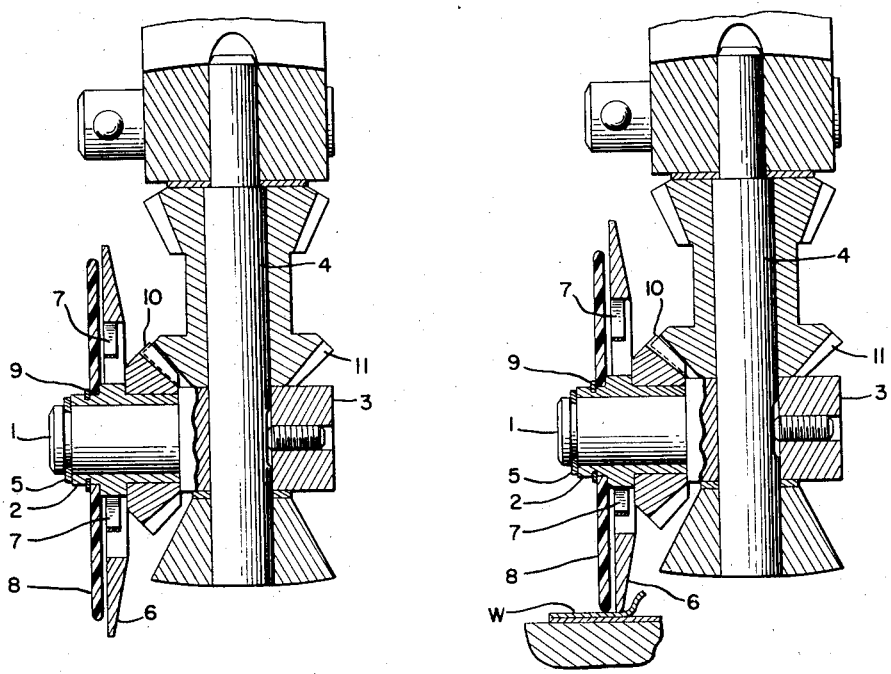
INVENTOR.
JOHN D. RUSSELL
BY Charles J. Elderkin
ATTORNEY United States Patent Office 2,918,564
Patented Dec. 22, 1959

2,918,564
PRESSURE-CONTROLLABLE ROTARY WELDING ELECTRODES

John D. Russell, Hollywood, Calif.

Application March 13, 1958, Serial No. 721,255

9 Claims. (Cl. 219—84)

This invention relates to electrical resistance welding apparatus and particularly to a novel and improved rotary electrode assembly. While not limited thereto, the invention is particularly applicable to hand-guided welding devices of the type wherein the pressure of the electrode on the work is determined by the operator.

A typical hand-guided welding device of the type with which the electrode assembly of the present invention is particularly advantageous is disclosed in my co-pending application Serial Number 721,256, filed concurrently herewith. In such device, the rotary welding electrode is mounted on a handle unit and is motor driven, so that, when the operator manipulates the handle unit to engage the electrode with the work, and the motor is energized, the electrode acts as a traction roller to drive the unit along the work or, if the work is movable, to drive the work past the welding device. Since the rotary electrode serves as a traction drive, the operator need give little or no attention to the matter of relative movement between the electrode and the work. But, without special provision such as the electrode assembly of the present invention, it is still necessary for the operator to estimate the pressure with which the electrode is applied to the work.

A general object of the invention is to devise a novel rotary welding electrode assembly which, for all practical purposes, assures automatically that the electrode will engage the work with the proper pressure.

Another object is to provide such a device which is particularly applicable to small size, hand-guided welding devices.

In order that the manner in which these and other objects are accomplished in accordance with the invention can be understood in detail, reference is had to the accompanying drawings, which form a part of this specification, and wherein:

Fig. 1 is an elevational view, with some parts broken away for clarity, of a welding electrode assembly constructed in accordance with one embodiment of the invention, the drive mechanism therefor being omitted;

Fig. 2 is a vertical sectional view, taken on line 2—2 of Fig. 1, and additionally illustrating the drive mechanism therefor, and Fig. 3 is a view similar to Fig. 2 but illustrating the manner in which the assembly is engaged with the work.

Turning now to the drawings in detail, it will be seen that this embodiment of the invention comprises a shaft 1 on which is rotatably mounted a hub 2. Shaft 1 is fixed to a mounting block 3 which in turn is fixed to a second shaft 4 from which shaft 1 extends radially.

Hub 2 is rotatable on shaft 1, being disposed between a snap ring 5, engaged in a groove in shaft 1 in the usual fashion, and a shoulder presented by block 3. Lying transversely of shaft 1 is a substantially rigid metal electrode ring 6 having a circular, knife-edge, periphery. Electrode ring 6 is mounted on hub 2 by a plurality of spring metal spokes 7 each extending from the hub spirally outward to the ring. The ends of spokes 7 are secured respectively to the hub and ring in any suitable conventional fashion, as by brazing, for example. The spokes 7 thus constitute radially resilient means allowing the ring 6 to be shifted in its plane transversely of the shaft 1.

The end portion of hub 2 opposite block 3 is of smaller diameter than the main body of the hub. Disposed parallel to and in close side-by-side relation with ring 6 is a rigid roller 8 formed by a disc of electrical insulating material and having a circular central opening through which the smaller diameter portion of hub 2 extends, the wall of such central opening being in contact with the surface of the hub. Roller 8 is secured in place by a snap ring 9, engaged in a groove in hub 2, in the usual fashion. Roller 8 has a circular periphery and a diameter smaller than the outer diameter of electrode ring 6.

Fixed to the end of hub 2 adjacent block 3 is a bevel gear 10. A bevel gear 11 is rotatively mounted on shaft 4 and operatively engaged with gear 10. Thus, hub 2, and therefore electrode ring 6, is rotatively driven by suitable power means arranged to drive gear 11, as in the manner described in my aforementioned co-pending application Serial Number 721,256.

When the electrode assembly is not in use, electrode ring 6 is centered about the axis of shaft 1, as seen in Figs. 1 and 2. In use, the operator so manipulates the welding device that the periphery of electrode ring 6 engages the work W and that the electrode assembly as a whole is urged toward the work in the direction of the plane of ring 6. As a result, spiral spring spokes 7 are distorted, electrode ring 6 being shifted transversely of shaft 1 until the periphery of roller 8 engages the work, adjacent the point where the work is engaged by electrode ring 6, in the manner illustrated in Fig. 3. Further movement of the electrode assembly toward the work is prohibited by contact of roller 8 with the work. Accordingly, ring 6 is urged resiliently against the work with a predetermined pressure dependent upon the spring characteristics of spokes 7 and the difference between the diameters of ring 6 and roller 8.

Welding current can be applied to electrode ring 6 in any suitable fashion. Thus, with hub 2, shaft 1, block 3 and shaft 4 all of metal, these parts can form a conductive circuit connected to ring 6 via spring spokes 7.

I claim:

1. In a welding electrode assembly, the combination of a conductive electrode roller element, shaft means, a relatively rigid stop roller mounted on said shaft means, and resilient means mounting said electrode roller element on said shaft means in side-by-side relation with said stop roller, the diameter of said electrode roller element being larger than the diameter of said stop roller, and said resilient means being effective to allow said electrode roller element to be shifted transversely of said shaft means.

2. In a welding electrode assembly, the combination of shaft means, a substantially rigid stop roller mounted on said shaft means, an electrode roller element, and resilient means mounting said electrode roller element on said shaft means, in side-by-side relation with said stop roller, for bodily movement linearly in a plane parallel to said stop roller, said electrode roller element having a diameter greater than that of said stop roller.

3. In a welding electrode assembly, the combination of a pair of rollers disposed side-by-side, and means mounting said rollers for rotation about the same axis, one of said rollers being mounted for resilient movement in a radial direction by means of spring members connected thereto, the other of said rollers being substantially rigid, said radially resilient roller constituting an electrically conductive welding electrode, and said other roller having a diameter smaller than the diameter of said radially resilient roller.

4. In a welding electrode assembly, the combination of a first roller comprising an electrically conductive, work-engaging peripheral portion, a hub, and resilient means supporting said peripheral portion on said hub; a second substantially rigid roller having a diameter smaller than said first roller; means mounting said rollers in side-by-side relation for rotation about the same axis, and means providing an electrically conductive path arranged to supply welding current to a work piece contacted by said assembly only via said first roller.

5. A welding electrode assembly in accordance with claim 4 and wherein at least the peripheral portion of said second roller is of electrical insulating material.

6. A welding electrode assembly in accordance with claim 4 and wherein said resilient means comprises a plurality of spirally extending spring spokes.

7. In a rotary welding electrode assembly, the combination of shaft means, a substantially rigid disc of electrical insulating material mounted for rotation about the axis of said shaft means and having a circular work-engaging periphery, and a discoid welding electrode mounted beside said disc for rotation about the axis of said shaft means, said electrode being mounted for resilient movement in a radial direction by means of spring members connected thereto and having a diameter larger than the diameter of said disc.

8. A welding electrode assembly for a hand-guided welding device, comprising a pair of rollers and means mounting said rollers side-by-side for rotation about the same axis, one of said rollers having an electrically conductive peripheral portion and being mounted for resilient movement in a radial direction by means of spring members connected thereto, the diameter of the other of said rollers being smaller than the diameter of said radially resilient roller, said assembly including an electrically conductive path arranged to supply welding current to the work only via said radially resilient roller.

9. A welding electrode assembly for a hand-guided welding device, comprising an annular conductive electrode element, shaft means, radially resilient means mounting said electrode element for rotation generally about the axis of said shaft means, and rigid stop means carried by said shaft means and disposed to limit the radial movement of said electrode element.

References Cited in the file of this patent

UNITED STATES PATENTS 1,580,401     Borgadt _____ Apr. 13, 1926